(12) United States Patent
Versini

(10) Patent No.: US 8,178,139 B2
(45) Date of Patent: May 15, 2012

(54) SPHERICAL CAPSULE FOR AN AUTOMATIC BEVERAGE PREPARATION AND DISPENSING MACHINE AND METHOD OF USE OF THE CAPSULE

(76) Inventor: Rolland Versini, Marseilles (FR)

(*) Notice: Subject to any disclaimer, the term of this patent is extended or adjusted under 35 U.S.C. 154(b) by 113 days.

(21) Appl. No.: 12/516,207

(22) PCT Filed: Nov. 27, 2007

(86) PCT No.: PCT/FR2007/001941
§ 371 (c)(1),
(2), (4) Date: Oct. 9, 2009

(87) PCT Pub. No.: WO2008/071878
PCT Pub. Date: Jun. 19, 2008

(65) Prior Publication Data
US 2010/0215808 A1     Aug. 26, 2010

(30) Foreign Application Priority Data

Nov. 28, 2006  (FR) .................................. 06 10402

(51) Int. Cl.
| | |
|---|---|
| *B65B 29/02* | (2006.01) |
| *A23L 1/00* | (2006.01) |
| *A23G 3/00* | (2006.01) |
| *A47J 31/44* | (2006.01) |
| *A47J 31/057* | (2006.01) |
| *A47J 31/06* | (2006.01) |

(52) U.S. Cl. ................. 426/77; 99/295; 99/275; 99/290; 426/89; 426/90; 426/78

(58) Field of Classification Search ........................ None
See application file for complete search history.

(56) References Cited

U.S. PATENT DOCUMENTS

2005/0136155 A1* 6/2005 Jordan et al. .................... 426/77

FOREIGN PATENT DOCUMENTS

| DE | 298 11 729 U1 | 10/1998 |
| FR | 1 305 737 A | 10/1962 |
| FR | 2 879 175 A | 6/2006 |
| FR | 2879175 A1 * | 6/2006 |

(Continued)

OTHER PUBLICATIONS

"New Products Spotlight" Packaging Digest 42(2):15, Feb. 2005; posted on http://connection.ebscohost.com/c/articles/16110259/new-products-spotlight; accessed on May 11, 2011.*

(Continued)

Primary Examiner — Humera Sheikh
Assistant Examiner — Subbalakshmi Prakash
(74) Attorney, Agent, or Firm — Jackson Patent Law Office

(57) ABSTRACT

Disclosed is a capsule designed to be used in an automatic beverage preparation and dispensing machine. The capsule includes a compacted aggregate of a substance to be infused; and a packaging envelope impermeable to air and water. The packaging envelope is configured to hold the compacted aggregate of the substance in the interior of the capsule so that infusion is carried out in the interior of the capsule. Also disclosed is a method comprising piercing the packaging envelope of the capsule, using a piercing device of an automatic beverage preparation and dispensing machine.

12 Claims, 1 Drawing Sheet

FOREIGN PATENT DOCUMENTS

WO    WO 2006030461 A1 *    3/2006

OTHER PUBLICATIONS

International Search Report, Jul. 15, 2008, from International Phase of the instant application.

English Translation of the Written Opinion of the International Search Authority, Jun. 9, 2009, from International Phase of the instant application.

English Translation of International Preliminary Report on Patentability Chapter I, Jun. 10, 2009, from International Phase of the instant application.

* cited by examiner

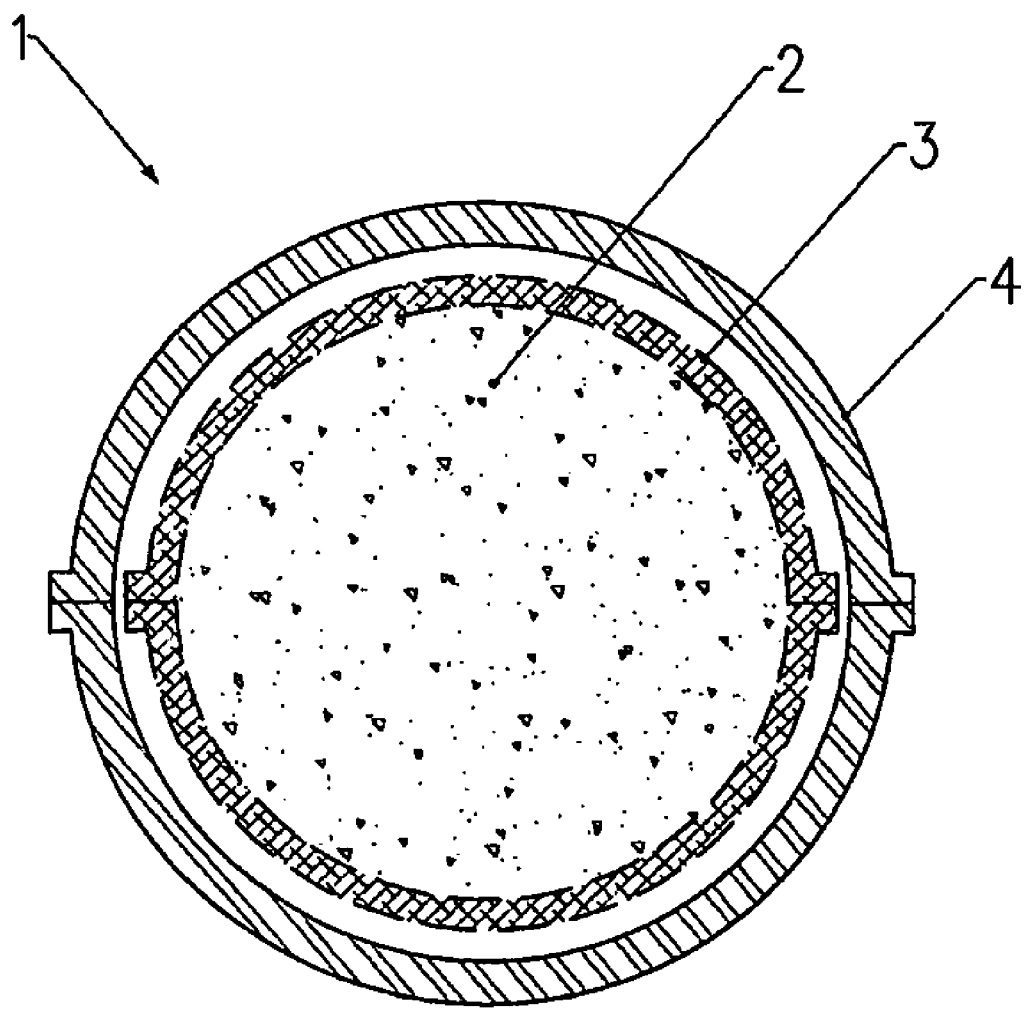

SPHERICAL CAPSULE FOR AN AUTOMATIC BEVERAGE PREPARATION AND DISPENSING MACHINE AND METHOD OF USE OF THE CAPSULE

TECHNICAL FIELD OF THE INVENTION

An object of the present invention is a spherical capsule designed for use in a machine for automatically preparing and dispensing beverages. An object of the invention is also a method for preparing a beverage from this capsule.

The invention relates to the general technical field of disposable capsules for the preparation of beverages, preferably, but not exclusively, for the preparation of coffee, and whose content to be infused remains in the package. It relates more particularly to the technical field of capsules designed to be perforated to enable injection of pressurized water into the interior of the aforementioned capsule. The invention also relates to the technical field of methods enabling infusion of such capsules.

The "capsule" object of the invention is to be differentiated from a "pod" of the type described in the document FR 2,879,175 (Luciani). The capsule has a packaging envelope that serves as an infusion chamber. In contrast, a pod is used only to convey a predetermined amount of substance to be infused into an infusion chamber specific to the machine. In the case where the pod comprises a packaging envelope, it only serves to protect the substance to be infused and must first be torn to remove the aforementioned pod.

STATE OF THE ART

Disposable pods and capsules are well known from the prior art and described in particular in the documents WO 2004/006740 (SEB), WO 94/01344 (Nestle), U.S. 2004/0197444 (Kraft Foods), U.S. Pat. No. 5,012,629 (Kraft Foods), WO 2004/087529 (Hausbrandt), EP 1,221,418 (Melitta Haushaltsprodukte), EP 1,295,554 (SGL Italia) and EP 0,583,210 (Fornari).

Sealed capsules adapted to be opened by the pressure of the injected water are particularly advantageous because they enable attainment of high-quality beverages. Known in particular, from the document EP 0,554,469 (Nestle), is a capsule designed to be used in an machine for automatic beverage preparation, the aforementioned capsule being formed by a compacted aggregate of a substance to be infused held in an packaging envelope impermeable to air and water and having the shape of a cone frustum.

In addition to hygienic reasons, using an air and water impermeable packaging envelope provides the advantage of being able to store the capsules for a relatively long period without any degradation of the flavor and aromas of the beverage. In addition, the infusion of the beverage can be performed directly in the capsule, the packaging envelope acting as an infusion chamber.

Another feature of this capsule is that the packaging envelope is configured to burst at the time of the injection of pressurized water into the aforementioned capsule. The packaging envelope bursts only in a weakness zone provided at the base of the cone frustum.

Because of its shape and design, such a capsule must be placed in the infusion chamber in a specific position. In fact, the infusion is performed by a piercing device configured to pierce the top of the cone frustum and to inject pressurized water. Under the effect of the pressure, the weakness zone arranged at the base of the cone frustum bursts and the water is infused through the capsule toward a recovery conduit for the infused substance.

The major disadvantage of this type of capsules is that they must be positioned so that the top of the cone frustum is opposing the piercing device and that the weakness zone at the base of cone frustum is opposing the recovery conduit for the infused substance, at the risk of damaging the machine. Therefore, it is necessary to provide means to impose the positioning of the capsule in the infusion chamber. The design of the machine becomes complex and it is not possible to provide a machine equipped with a reservoir where the capsules would be stored in bulk and automatically conveyed to the infusion chamber.

To date, machines using such capsules cannot automatically dispense multiple beverages consecutively, making them unusable in bar trades, groups, businesses, or in all other places where a large number of beverages must be prepared daily.

In view of the disadvantages of the prior art, and in particular those of the capsules described in EP 0,554,469 (Nestle), the main technical problem that the invention aims to resolve is to provide a capsule employable in any position in a machine for the automatic preparation and dispensing of beverages, equipped with a device to pierce the envelope of the capsule and to inject pressurized water into the interior of the aforementioned capsule. A particularly advantageous feature of the capsule object of the invention is that it requires no pre-positioning in the infusion chamber of the aforementioned machine.

A goal of the invention is to provide a particularly simple to implement method for preparing a beverage from the capsule.

Another goal of the invention is to provide a capsule adapted to be stored in bulk in a reservoir coupled to the infusion chamber of the machine.

Yet another goal of the invention is to provide an inexpensive capsule having a simple design, and adapted to conserve in optimal conditions the quality of the substance to be infused.

DISCLOSURE OF THE INVENTION

The solution provided by the invention is a capsule of the type described in EP 0,554,469 (Nestle). The capsule is formed by a compacted aggregate of a substance to be infused, held in a packaging envelope, impermeable to air and water, so that the infusion can be carried out in the interior of the capsule. The packaging envelope has a substantially spherical external shape. In addition, the packaging envelope is configured to burst on substantially any part of its surface when water is injected into the aforementioned capsule under a pressure of 5 to 20 bar.

These features mean that the capsule can be pierced on substantially any portion of its surface, irrespective of the position of the latter relative to the piercing and infusion device and to the device for recovery of the infused substance.

Known, from the document DE 298.11.729.U1 (Faulhaber) or FR 1,305,737 (Audibert), are spherical pods requiring no pre-positioning, but whose outer envelope is not impervious to air and water. In addition, the outer envelope cannot be pierced in preparation for injection of pressurized water. Furthermore, the outer envelope is not configured to burst under the effect of pressure on substantially any part of its surface at the time of the injection of water into the capsule.

The document FR 2,879,175 (Luciani) describes a pod (and not a capsule) formed by a compacted aggregate of a substance to be infused, held in an envelope having a substantially spherical external shape. The envelope is constituted by filter paper of the type conventionally used for making tea bags. The envelope is thus not impervious to air and water, infusion in the interior of the pod being impossible. Furthermore, the pod is unprotected and cannot be conserved as is without loss of aromas and flavors. In addition, the envelope made of fragile filter paper causes risks of splits and tears in the pod during its handling, which do not exist with the capsule of the invention.

The envelope of the pod described in document FR 2,879,175 (Luciani) is configured to shatter under the force of compression applied by the packing piston. It is thus not the pressurized water that bursts the envelope, but the mechanical action of the packing piston that causes the initially spherical pod to assume the thickness of a pancake.

This pod designed to be used specifically in a conventional automatic machine for preparation and dispensing of beverages, comprising an infusion chamber and two pistons:

a first piston to pack the portion of ground coffee conveyed by the pod and injected with the water on the aforementioned portion and, opposed to the first piston, a second piston for the infusion of the beverage.

The pod is crushed by the packing piston in the infusion chamber so as to form a cake of coffee that will be infused. The infusion is performed in the interior of the infusion chamber and not in the interior of the pod because the latter is literally shattered by the piston.

The hot water is dispensed by the first piston, and then goes through the portion of coffee (shattered pod). The infused beverage is then recovered by the second piston.

Another aspect of the invention relates to a process for preparing a beverage, wherein:

the packaging envelope of the capsule, in accordance with the preceding features, is pierced, water under a pressure of 5 to 20 bar is injected into the interior of the capsule so as to infuse the substance contained in the latter, the infusion being carried out in the interior of the aforementioned capsule, the beverage, flowing through the part of the packaging envelope that has been pierced under the effect of the injection pressure of the water, is recovered.

PRESENTATION OF THE DRAWING

Other advantages and features of the invention will better appear upon reading the description of a preferred implementation mode that will follow, in reference to the attached drawing, made by way of guiding non-limiting example and in which FIG. 1 is a schematic sectional view of a capsule in accordance with the invention.

IMPLEMENTATION MODES OF THE INVENTION

Referring to FIG. 1, the capsule 1 is formed by a compacted aggregate of a substance to be infused 2 held in a filtering envelope 3 and an external packaging envelope 4. The presence of the filtering envelope 3 is not essential to the operation of the capsule. The substance to be infused 2 is preferably coffee, but can be tea, milk powder, chocolate powder, soup, etc.

Referring to FIG. 1, the filtering envelope 3 is positioned between the compacted aggregate of the substance to be infused 2 and the packaging envelope 4. This filtering envelope 3 enables filtering of the substance to be infused 2 irrespective of the positioning of the capsule 1 in the infusion chamber of the machine and irrespective of the punctured part of the capsule. In addition, the filtering envelope 3 can act as a barrier against certain chemical attacks caused by the material constituting the packaging envelope 4.

The filtering envelope 3 is advantageously constituted by a porous woven or non-woven material, comprising natural and/or synthetic fibers. For example filtering paper or fabric of the type employed in the manufacture of tea bags can be employed.

The volume of the capsule 1 depends on the machine and the substance to be infused 2. In practice, when it contains coffee, the diameter of the capsule 1 is advantageously between 20 mm and 40 mm. It contains preferably between 5 g and 15 g of coffee packed in order to have a density of between 0.6 and 0.75 $kg/dm^3$.

In accordance with the invention, the packaging envelope 4 is air and water impermeable and has a substantially spherical external shape and can be pierced on substantially any part of its surface. Preferably, the packaging envelope 4 is configured to burst under the effect of pressure on substantially any part of its surface at the time of the injection of water into the capsule 1. The result attained is that the capsule 1 can be pierced by the piercing device of the machine and can burst irrespective of its position in the infusion chamber. A similar result can be obtained with a capsule whose packaging envelope 4 has a substantially cubic external shape.

By "substantially", it is meant the fact that certain parts of the capsule such as the zone reserved for a trademark, or, as described below, the sealing zones of the two half-shells constituting the aforementioned capsule cannot be fully pierced or burst because of possible double thicknesses.

The packaging envelope 4 is advantageously made of aluminum, from 20 µm to 120 µm thick. However, other air and water impermeable materials can be used such as flexible or rigid plastics of the polypropylene, polyvinyl chloride, polyethylene, food-grade plastic, etc., type. When the packaging envelope 4 is made of aluminum, it is advantageous to provide a membrane of food-grade film arranged on the inner surface of the aforementioned envelope so as to protect the substance to be infused 2 against possible chemical attacks.

In another implementation variant, a spherical pod made of filtering paper dipped in a bath of food-grade rubber can be used initially. In this way, while maintaining the spherical shape, a layer of food-grade rubber is added around the layer of filtering paper. This layer of rubber forms, after drying, the air and water impermeable packaging envelope in order to obtain a capsule in accordance with the invention.

In practice, the puncture of the capsule 1 is carried out by the action of the injection pressure at a puncturing zone arranged in the infusion chamber of the machine. The capsules known from the prior art, and in particular those described in document EP 0,554,469 (Nestle), comprise a packaging envelope that bursts only at a weakness zone specifically provided on the surface of the aforementioned envelope. The capsule object of the invention is distinguished by the fact that its packaging envelope is configured to be burst on substantially any part of its surface when water is injected into the aforementioned capsule under a pressure of 5 to 20 bar.

The pressure at which the beverage is infused determines its quality. In practice, the higher the pressure, the higher the quality of the infused beverage. It is possible to vary the thickness of the packaging envelope 4 in order to obtain different types of capsules associated with different qualities of beverage.

For example a first type of capsule can be provided, having a thin (20 µm for example) packaging envelope designed to burst under low pressure (5 bar for example) and able to produce a beverage of suitable quality. For example a coffee-based beverage of the American breakfast will be obtained, i.e. whose coffee is much less processed and much less strong than espresso but retaining the technique known as "espresso".

A second type of capsule can also be provided, having an intermediate thickness (50 μm for example) packaging envelope designed to burst under moderate pressure (10 bar for example) and able to produce a beverage of superior quality, of the "French espresso" type.

Finally, a third type of capsule can also be provided, having a thick (120 μm for example) packaging envelope designed to burst under high pressure (20 bar for example) and able to produce a high quality beverage of the "Italian espresso" type (stronger than "French espresso").

The manufacturing process of the spherical capsule 1 is well known to the person of skill in the art and described for example in document FR 2,879,175 (Luciani).

The filtering envelope 3 is advantageously formed by two half-envelopes of filtering material sealed to one another along their peripheral edge so that they cannot burst at the time of the injection of pressurized water into the aforementioned capsule. Similarly, the packaging envelope 4 is advantageously formed by two half-envelopes of air and water impermeable material sealed to one another along their peripheral edge so that they can be punctured and possibly burst at the time of the injection of pressurized water into the aforementioned capsule. In an implementation variation, the two half-envelopes of the packaging envelope 4 are fused to one another by ultrasound. In another implementation variation, they are sealed to one another by insertion and snap-fit of their edge on one another in the same way as certain hard gelatin medicine capsules.

The process for preparing a beverage from the capsule 1 previously described is then very simple. It suffices to pierce the packaging envelope 4 of the capsule 1 and inject water under a pressure of 5 to 20 bar into the interior of the aforementioned capsule in order to infuse the substance 2 contained in the latter. Using the packaging envelope 4 that is air and water impermeable, the infusion is carried out in the interior of the capsule 1. It then recovers the beverage flowing through the part of the packaging envelope 4 that was punctured under the effect of the injection pressure of the water or that was previously pierced.

The capsule 1 in accordance with the invention is designed to be used in a machine for automatically preparing and dispensing of a beverage of the type including a device to pierce the aforementioned capsule and inject pressurized water into its interior. Such machines are for example described in the documents EP 0,242,556 (Nestle) or EP 1,295,554 (SGL Italia).

The invention claimed is:

1. A capsule designed to be used in an automatic beverage preparation and dispensing machine, the capsule comprising:
    a compacted aggregate of a substance to be infused;
    a packaging envelope impermeable to air and water, the packaging envelope having a surface defining an interior and defining a substantially spherical external shape, the packaging envelope being configured to burst on substantially any part of the surface when water is injected into the interior of the capsule under a pressure of 5 to 20 bar and to hold the compacted aggregate of the substance in the interior of the capsule so that infusion is carried out in the interior of the capsule.

2. A capsule according to claim 1, wherein the packaging envelope is made of aluminum, from 20 μm to 120 μm thick.

3. A capsule according to claim 2, wherein a membrane of food-grade film is arranged on the inner surface of the packaging envelope so as to protect the substance to be infused against possible chemical attacks.

4. A capsule according to claim 1, wherein the packaging envelope is made of flexible or rigid plastic, impermeable to air and water, of the polypropylene, polyvinyl chloride, polyethylene, or food grade plastic type.

5. A capsule according to claim 1, wherein the packaging envelope is formed by two half-envelopes of air and water impermeable material sealed to one another along their peripheral edge so that they can be punctured and burst at the time of the injection of pressurized water into the aforementioned capsule.

6. A capsule according to claim 1, wherein the packaging envelope is formed by two half-envelopes of air and water impermeable material fused to one another by ultrasound.

7. A capsule according to claim 1, wherein the packaging envelope is formed by two half-envelopes of air and water impermeable material sealed to one another by insertion and snap-fit of their edge on each other.

8. A capsule according to claim 1, wherein a filtering envelope holds the compacted aggregate of the substance to be infused.

9. A capsule according to claim 8, wherein the filtering envelope is constituted by a porous woven or non-woven material including natural and/or synthetic fibers.

10. A capsule of according to claim 8, wherein the filtering envelope is formed by two half envelopes of filtering material sealed to each other along their peripheral edge so that they cannot burst at the time of the injection of pressurized water into the aforementioned capsule.

11. A capsule according to claim 1, wherein the packaging envelope is a layer of food-grade rubber impermeable to air and water.

12. A method for preparing a beverage, the method comprising the steps of:
    piercing the packaging envelope of the capsule in accordance with claim 1, the piercing step including using a piercing device of an automatic beverage preparation and dispensing machine;
    injecting water under a pressure of 5 to 20 bar into the interior of the capsule so as to infuse the substance contained in the latter, the infusion being carried out in the interior of the capsule; and
    recovering the beverage, flowing through the part of the packaging envelope that has been pierced under the effect of the injection pressure of the water.

* * * * *